United States Patent Office 3,182,575
Patented May 11, 1965

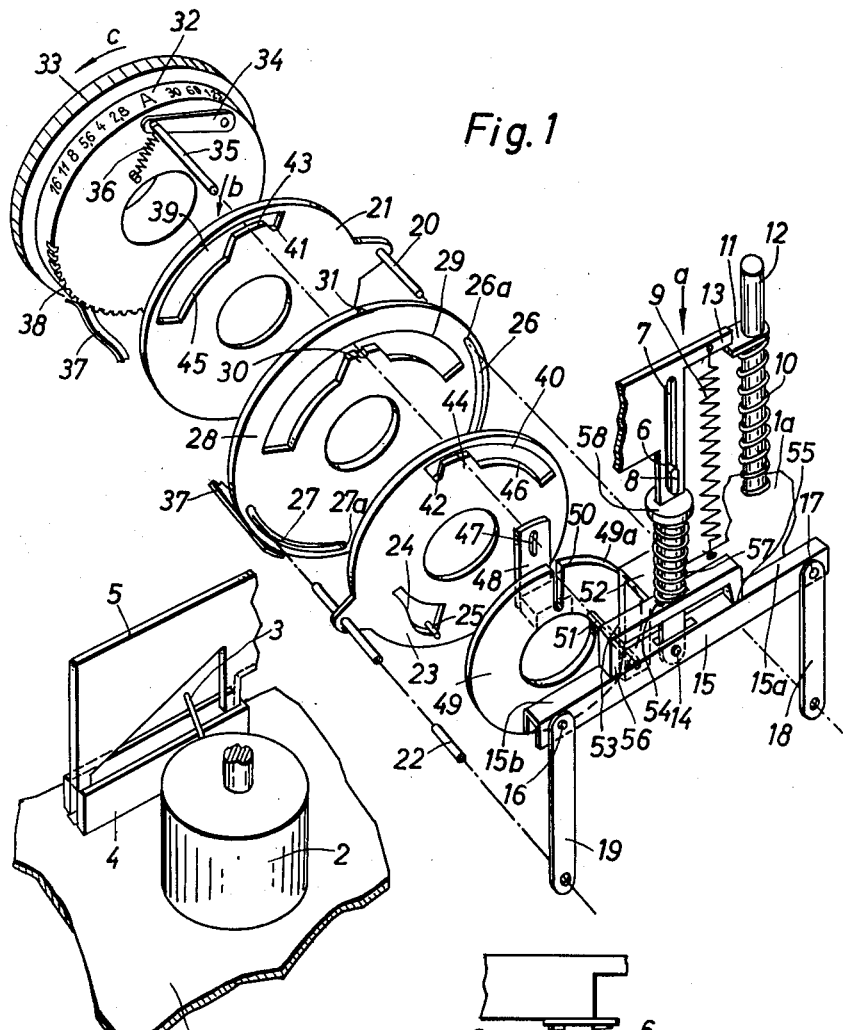
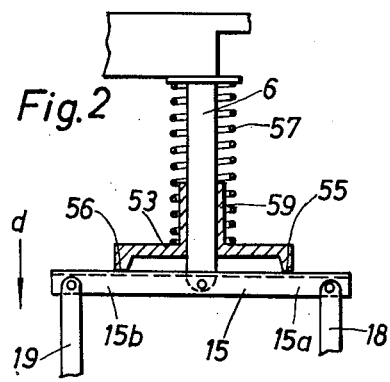

3,182,575
CAMERA CAPABLE OF BEING OPERATED IN A FULLY AUTOMATIC OR SEMI-AUTOMATIC MANNER
Franz Jakob, Unterhaching, near Munich, and Karl Wagner, Munich, Germany, assignors to Agfa Aktiengesellschaft, Leverkusen, Germany
Filed Jan. 7, 1963, Ser. No. 249,643
Claims priority, application Germany, Jan. 8, 1962,
A 39,173
13 Claims. (Cl. 95—10)

The present invention relates to cameras.

More particularly, the present invention relates to cameras which are at least partly automatic in the sense that they are capable of being at least partly set in an automatic manner according to the lighting conditions.

Such cameras have had a considerable development in the art, and in fact some of the known structures are quite simple and inexpensive. However, where cameras of this type are provided with a relatively simple structure there is only a limited possibility of automatic setting. For example, with a camera of this type it may be possible to automatically set only the exposure time after a preselected aperture setting has been made manually by the operator. Also, with cameras of this type it is possible to automatically set both the aperture and the exposure time in a predetermined combination with the possibility of a following manual change of both the exposure time and the aperture.

It is accordingly a primary object of the present invention to provide a camera of the above type which has a far greater range of possibilities of adjustment while still being extremely simple and inexpensive in its construction.

In particular, it is an object of the invention to provide a relatively simple and inexpensive structure which is capable of automatically setting both the exposure time and the aperture and which at the same time provides the operator with the possibility of manually selecting a setting of either the exposure time or the aperture while providing automatic setting of which ever one of these factors is not manually set by the operator.

A further object of the present invention is to provide a camera of the above type with the possibility of manual setting of either of the exposure time or the aperture at the option of the operator while using a construction which requires a very small number of moving parts so that it is extremely simple and inexpensive.

An additional object of the present invention is to provide a structure capable of accomplishing the above objects while at the same time being very reliable in its operation and providing an extremely compact assembly made up of a relatively small number of simply constructed elements.

With these objects in view the invention includes, in a camera, an exposure-time setting means and an aperture setting means. The camera also includes a light-responsive means having a movable element whose position is determined by the lighting conditions, and a scanning means which scans the position of the movable element of the light-responsive means. A differential means is operatively connected to the scanning means to be driven thereby and is also operatively connected to both of the setting means for actuating the latter. A manually operable selecting means is provided for manually setting either the exposure-time setting means or the aperture setting means at the option of the operator, and this selecting means has an automatic position in which both of the setting means are to be automatically set. A positioning means cooperates with the differential means for automatically maintaining the latter in a predetermined neutral position transmitting the movement of the scanning means to both of the setting means in a predetermined ratio when the selecting means is in its automatic position, and the differential means will operate automatically to set that one of said setting means which is not manually set by the operator when the setting means is displaced by the operator from its automatic position for the purpose of selectively setting one of the setting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective, exploded illustration of one possible embodiment of a structure according to the present invention; and FIG. 2 is a fragmentary partly sectional elevation showing another embodiment of that part of the structure of FIG. 1 which maintains the differential means in its neutral position.

Referring to FIG. 1, there is shown therein a stationary plate 1 of the camera, this plate 1 carrying a light-responsive means which includes the electrical instrument 2 which may, for example, be in the form of a galvanometer and which is actuated in a manner well known in the art from a photo cell or other photosensitive element, the meter 2 being turnably supported in a known way for the purpose of introducing the factor of the speed of the film which is used in the camera, as is well known in the art. The light responsive means 2 includes a movable element 3 which moves in a manner well known in the art with the moving coil of the meter so that the position of the movable element 3 of the light-responsive means is determined by the lighting conditions, as is also well known in the art. This movable element 3 is capable of moving freely over a pair of stationary supporting members 4 which limit the downward deflection of the element 3 so as to protect the instrument 2 when the position of the element 3 is scanned. A scanning means is provided for scanning the position of the element 3 just prior to exposure of the film of the camera, and this scanning means includes a plate 5 which has an inclined scanning edge located over the element 3, as is indicated in FIG. 1. The scanning means 5 has an elongated portion 6 which is formed with an elongated slot 7 receiving the stationary pin 8, and it will be noted that the plate 5 is also guided between the pair of plates 4 whose upper edges limit the downward deflection of the element 3, so that in this way the scanning means 5 is guided only for vertical movement in its own plane which is normal to the optical axis. Thus, the scanning means 5 is capable of moving only in the direction of the arrow $a$ or in a direction directly opposed to this arrow. One end of a spring 9 is connected to the scanning means 5 and the other end of the spring 9 is connected to a stationary part of the camera so that the spring 9 urges the scanning means to move in the direction of the arrow $a$. A return spring 10 opposes the spring 9 and is stronger than the spring 9, this spring 10 having its bottom end in engagement with a portion 1a of the stationary wall 1 of the camera, and the spring 10 is coiled freely about an elongated actuating rod 12 of the camera, the upper end of the spring bearing against a lug 11 which is fixed to the rod 12 and which extends beneath a portion 13 of the scanning means 5. Thus, when the rod 12 is not depressed by the operator, the spring 10 will maintain the rod 12 in the rest position thereof illustrated in FIG. 1, and due to the cooperation of the lug 11 with the extension 13, the scanning means 5 will be maintained also by the spring 10 in the illustrated rest position where the spring 9 is tensioned and the scanning edge of the plate 5 is spaced from the element 3 so that the latter can turn to whatever positions are called for by the lighting conditions.

A differential means is operatively connected to the elongated portion of the scanning means 5 to be driven by the scanning means when the latter is moved by the spring 9, and this differential means includes an elongated lever 15 which is pivotally connected intermediate its ends, by a pivot pin 14, to the elongated portion 6 of the scanning means 5. The pivotal connection of the lever 15 to the elongated portion 6 of the scanning means 5 is situated midway between the ends of the lever 15 so that it has on opposite sides of the pivot pin 14 a pair of arms 15a and 15b which are of equal length. A pair of pivot pins 16 and 17 serve to pivotally connect to the free end portions of the lever 15 a pair of links 18 and 19 which also form part of the differential means, and the pivot pins 16 and 17 are equidistant from the pivot pin 14. The end portion of the link 18 which is distant from the lever 15 is pivotally connected with a pin 20 which is fixedly connected with an aperture setting means in the form of a rotary ring 21 supported in a known way for turning movement about the optical axis which passes through the center of the aperture setting ring 21. The link 19 is pivotally connected at its end portion distant from the lever 15 to a pin 22 which is fixed to an exposure time setting means in the form of a rotary exposure time setting ring 23 which is coaxial with the aperture setting means 21 and which thus also is turnable about the optical axis which passes through the center of the ring 23. The aperture setting ring 21 can be fixed with a known diaphragm setting ring or can itself form such a diaphragm ring, so that when the ring 21 turns the diaphragm will be set in a manner well known in the art. The exposure time setting ring 23 is formed with a slot having a camming edge 24 which controls the position of a pin 25 of a known and therefore unillustrated retarding mechanism which controls the exposure time of the shutter in a manner well known in the art.

The pins 20 and 22 respectively extend through slots 26 and 27 of a stationary disc 28, and the lengths of the slots 26 and 27 are such that both the exposure time setting means and the aperture setting means are capable of being moved through their entire range without any possible interference by engagement of the pins 20 and 22 with the ends of the slots 26 and 27, respectively. This stationary disc 28 is formed with an arcuate slot 29 extending along a circle whose center is in the optical axis, and midway between the ends of the slot 29 the disc 28 is provided with a projection 30. In addition, the disc 28 carries at its outer periphery an index 31 with which a scale 32 of a manually operable selecting means 33 cooperates so that the operator can manually select the desired type of operation, as described below.

The manually operable selecting means 33 is in the form of a rotary ring which is coaxial with the rings 21 and 23 and which is also turnable about the optical axis. This manually operable selecting means 33 is provided with the scale 32 having in its center the symbol A which when aligned with the index 31 indicates to the operator that the selecting means 33 is placed in an automatic position in which both of the setting means 21 and 23 will be automatically set through the differential means 15–19 which is driven from the scanning means 5 when the latter scans the position of the movable element 3 of the light-responsive means 2. On one side of the symbol A the scale 32 is provided with a series of graduations indicating different exposure times and on the other side of the symbol A the scale 32 includes a series of graduations indicating different aperture settings. Thus, the operator will turn the manually operable selecting means 33 in one direction in order to set the aperture manually by aligning with the index 31 a selected aperture size and the operator will turn the ring 33 in the opposite direction to align with the index 31 a selected exposure time when it is desired to manually set the exposure time.

A coupling pin 35 is movably carried by the manually operable selecting means 33 for movement generally toward and away from the optical axis, and the spring means 36 urges the coupling pin 35 to move in a direction in which it will approach the optical axis. For this purpose the ring 33 pivotally carries a lever 34 to the free end of which is fixed the pin 35, and the spring 36 is connected at one end to the ring 33 and at its opposite end to the lever 34 so as to urge the latter to turn in a direction where the pin 35 will generally approach the optical axis moving in the direction of the arrow b substantially radially toward the optical axis.

A releasable detent means is provided for releasably maintaining the ring 33 in the angular position in which it is placed by the operator, and this detent means includes a peripheral portion of the ring 33 which is provided with a series of recesses 38 and a leaf spring 37 which is fixed at one end to a stationary part of the camera and which has a free end adapted to enter into one of the recesses 38 for releasably holding the ring 33 in its selected position so that it will not move inadvertently from the selected position while at the same time the operator can easily override the force of the spring 37 to displace the ring 33 from one position to another position.

The coupling pin 35 extends through the slot 29 of the stationary disc 28 and in the automatic position of the selecting means 33 the coupling pin 35 rests on the projection 30 of the disc 28. The aperture setting ring 21 is formed with an arcuate slot 39 through which the coupling pin 35 also extends, and the slot 39 extends along a circle whose center is in the optical axis and whose diameter is equal to the circle along which the slot 29 of the disc 28 extends. The exposure time setting ring 23 is formed with an arcuate slot 40 through which the coupling pin 35 also extends, and the arcuate slot 40 also extends along a circle whose center is in the optical axis and whose diameter equals that of the circles along which the slots 39 and 29 respectively extend. The ring 21 is formed with a projection 43 extending from the edge 45 of the slot 39 into the latter and located adjacent the right end of the slot 39, as viewed in FIG. 1, so as to define with the right end of the slot 39 a notch 41. The exposure-time setting ring 23 is provided with a projection 44 extending from the edge 46 of the slot 40 and defining with the left end of the slot 40 a notch 42. The clearance between the projections 43 and 44 and the outer edges of the slots 39 and 40, respectively, is great enough to provide free movement of the coupling pin 35. The aperture setting means 21 and the exposure-time setting means 23 respectively have starting positions where their projections 43 and 44 are respectively aligned with each other as well as with the projection 30 of the stationary disc 28, so that when the manually operable selecting means 33 is placed by the operator in its automatic position the coupling pin 35 will engage not only the projection 30 but also the projections 43 and 44. The aperture setting ring 21 is connected to the diaphragm in such a way that in the starting position the largest aperture is provided and as the ring 21 turns in a clockwise direction, as viewed in FIG. 1, the aperture size becomes smaller, while the construction of the exposure-time setting ring 23 is such that in its starting position it provides the longest exposure time and while turning in a counterclockwise direction, as viewed in FIG. 1, from the position thereof shown in FIG. 1 it will provide progressively shorter exposure times. In the starting position of the rings 21 and 23, the notch 41 is located to the right of the projection 30 while the notch 42 is located to the left of the projection 30, as viewed in FIG. 1.

The coupling pin 35 is received at its front end in an elongated slot 47 of a lug 48 which is fixed to a rotary control disc 49 also supported for turning movement about the optical axis coaxially with the several rings described above. Thus, as a result of the connection of the coupling pin 35 with the lug 48 which is fixed to the disc 49, this latter disc necessarily turns with the manually operable selecting ring 33. The control disc 49 is formed with a radial slot 50 extending inwardly from its outer periphery and having the position indicated in FIG. 1 when the ring 33 is placed by the operator in its automatic position. A pin 51 is located directly over the slot 50 when the scanning means and differential means are in their rest position and the ring 33 is in its automatic position. This pin 51 is fixedly carried by an angle member 52 which is fixed with a positioning means 53 which maintains the differential means 15–19 in its neutral position which is shown in FIG. 1. In the neutral position of the differential means the drive from the scanning means 5 will be distributed in a predetermined ratio to the aperture setting means and exposure-time setting means, and in the particular example illustrated the ratio is such that the drive is equally distributed between the pair of setting means, the lever 15 extending horizontally at this time and because of the equal distances of the links 18 and 19, from the pivot 14 the movement of the differential means will be equally distributed to the rings 21 and 23, and the positioning means 53 maintains the differential means in this neutral position when the ring 33 has been placed in its automatic position. The positioning means 53 is in the form of an elongated horizontally extending member formed intermediate its ends with an opening 54 through which the elongated portion 6 of the scanning means 5 extends with some clearance, and as a result of the opening 54 it is possible for the positioning member 53 and the elongated portion 6 to move vertically one relative to the other. At its ends the positioning means 53 is provided with a pair of downwardly extending portions 55 and 56 which directly engage the lever 15 on opposite sides of the pivot 14 for maintaining the lever 15 in its neutral position, and a spring means urges the positioning means 53 downwardly against the lever 15, this spring means taking the form of a coil spring 57 coiled around the elongated portion 6 of the scanning means 5, engaging with its bottom end the positioning member 53, and engaging with its top end a plate 58 which is fixed to the elongated portion 6 of the scanning means 5.

The upward movement of the scanning means 5 to its rest position by the spring 10 is limited through any suitable stop structure, such as, for example, by engagement of the plate 58 with the guide member 8, and in the rest position of the scanning means and differential means the positioning means 53 will position the lever 15 horizontally and in this position the lever 15 will act through the links 18 and 19 on the aperture setting means 21 and exposure-time setting means 23 to position both of these setting means in their starting positions where their projections 43 and 44 are in alignment with each other as well as with the projection 30, and of course if the operator chooses to place the selecting ring 33 in its automatic position illustrated in FIG. 1, the pin 35 will extend across the aligned projections 43, 30, and 44, and also at this time the slot 50 will be vertically positioned with its outer open end located at the highest part of the periphery of the control ring 49 and in this position the pin 51 is located directly over the slot 50, as pointed out above. If it is assumed that the parts are in this position and the operator wishes to make an exposure with automatic setting of both the exposure time and aperture, then the operator will depress the rod 12 in the direction of the arrow $a$ in opposition to the spring 10, and under the influence of the spring 9 the scanning means 5 will follow the downward movement of the rod 12. This downward movement of the scanning means 5 will continue until its scanning edge engages the movable element 3 of the light-responsive means 2, pressing the element 3 against the upper edges of the support members 4. As a result of the downward movement of the scanning means 5, the differential means will also move downwardly so that the lever 15 is displaced downwardly and of course the links 18 and 19 will move downwardly therewith, and the pin 51 which is fixed to the positioning means 53 will enter into the slot 50 so that it will not be possible for the positioning means 53 to turn and thus the cooperating of the pin 51 with the slot 50 will guarantee that the positioning means 53 maintains the lever 15 in its horizontal, neutral position. The pin 51 is located at a lower elevation than the slot 54 through which the elongated portion 6 of the scanning means 5 extends and enters into the slot 50 shortly after the downward movement of the scanning means commences. The opening 54 itself could not guarantee an angular orientation of the positioning means 53 which would maintain the lever 15 in its neutral position, and the spring 57 is made sufficiently strong so that even if different forces are required to turn the rings 21 and 23, nevertheless the spring 57 will maintain both ends 55 and 56 of the positioning member 53 in engagement with the lever 15 to prevent the latter from turning with respect to the elongated portion 6 of the scanning means 5. Thus, with this construction, during the downward movement of the scanning means until its scanning edge engages the element 3 the drive of the scanning means will be transmitted through the differential means 15–19 equally to the pair of rings 21 and 23, turning the ring 23 in a counterclockwise direction to reduce the exposure time while simultaneously turning the ring 21 in a clockwise direction, as viewed in FIG. 1, so as to simultaneously reduce the size of the aperture, and in this way the camera is automatically set without any selection by the operator of either the exposure time or the aperture. While the rings 21 and 23 turn in opposite directions with respect to each other the ring 33 remains stationary and the pin 35 remains on the projection 30, the projections 43 and 44 of course turning away from the projection 30 in opposite directions, respectively.

If there is a considerable amount of light requiring a relatively short exposure time and a relatively small aperture, then if the ranges of movement of the exposure time setting means and aperture setting means are of different magnitudes, the differential means will distribute the drive from the scanning means in the predetermined ratio to the exposure time setting means and aperture setting means until that one of the setting means which has the shorter range of movement reaches the end of its range of movement, and then the link which is connected to the setting means of the shorter range of movement will not be capable of providing any further movement for this setting means so that the continued movement of the scanning means will cause the lever 15 to turn while the other setting means continues to be adjusted. Thus, assuming that the exposure-time setting ring 23 turns from its starting position to its end position through an angular distance smaller than the angular distance through which the aperture setting ring 21 can turn from its starting position to its end position, then when a considerable amount of light is available the pin 22 will engage the end 27$a$ of the slot 27 of the stationary disc 28 while the pin 20 is still capable of moving along the slot 26 while reducing the size of the aperture, and under these conditions since the link 19 cannot move further once the pin 22 engages the end 27$a$ of the slot 27, the continued movement of the scanning means will cause the lever 15 to turn about the pivot 16 and to be displaced from the projection 55 of the positioning member 53 while the link 18 continues to transmit movement to the ring 21, so that the lever 15 turns from its neutral position only after that one of the setting means which has the smaller range of movement reaches the end of its range of movement.

The end of the downward movement of the rod 12 may be used to trip the shutter and make the exposure, and when the rod 12 is then released, the spring 10 will return it to its starting position and at the same time it will act through the lug 11 and the extension 13 on the scanning means 5 to return the latter in opposition to the spring 9 also to its starting position, thus releasing the element 3 for free movement over the supporting plates 4, and of course the return of the scanning means to its starting position acts through the differential means 15–19 on the pair of setting means for returning the pair of setting means also to their starting positions.

If the operator should decide to make an exposure with preselection of a given exposure time, for example, then the operator will simply turn the selecting means 33 in the direction of the arrow c of FIG. 1 until the selected exposure time of the scale 32 is aligned with the index 31. As a result, the ring 33 will necessarily be displaced from its automatic position shown in FIG. 1, and during the turning of the ring 33 the coupling pin 35 will move to the left along the upper edges of the projections 43, 30 and 44, and as this pin rides off the projection 44 at this time it will necessarily be displaced by the spring 36 into the notch 42, so that the coupling pin 35 automatically couples the selecting ring 33 with the exposure-time setting means when the operator displaces the ring 33 from its automatic position in that direction which aligns a graduation of the series of exposure time values with the index 31. The operator simply continues to turn the ring 33 until the desired exposure time of the scale 32 is aligned with the index 31, and as a result of the turning of the ring 23 with the selecting ring 33 at this time, not only does the camming edge 24 cooperate with the pin 25 to set the selected exposure time, but in addition the pin 22 acts on the link 19 to displace it in the direction of the arrow a so that the lever 15 is at this time manually turned about the pivot 17. The releasable detent means 37, 38 serves to releasably retain the ring 33 in the position in which it is placed by the operator. Moreover, the turning of the coupling pin 35 acts not only to turn the ring 23 for setting the exposure time but also to turn the control ring 49 so that its slot 50 is necessarily displaced in a counterclockwise direction, as viewed in FIG. 1, from the position thereof shown in FIG. 1, and thus this slot 50 is displaced out of alignment with the pin 51. It is to be noted that the lever 15 will at this time turn in a counterclockwise direction, as viewed in FIG. 1, about the pivot 17 inasmuch as the pin 20 in the starting position of the ring 21 engages the upper end 26a of the slot 26 and thus the link 18 cannot move upwardly beyond the position shown in FIG. 1. When the rod 12 is depressed so as to release the scanning means to the spring 9, the pin 51 will simply engage the periphery 49a of the ring 49 and will be incapable of continuing its downward movement so that the lever 15 will move downwardly away from the positioning member 53 under these conditions and will be uninfluenced thereby so that the lever 15 will be free to turn with respect to the elongated portion 6 of the scanning means 5, and of course the spring 9 is stronger than the spring 57. As the scanning means 5 moves downwardly under these conditions the differential means operates automatically to set the aperture, the aperture setting means being that one of the two setting means which has not been set to a selected value by the operator. It is to be noted that the releasable detent means 37, 38 acts not only to retain the ring 33 in the selected angular position, in addition this releasable detent means acts through the coupling pin 35 which is in the notch 42 of the ring 23 on the latter to prevent turning of the ring 23, so that the ring 23 through the pin 22 prevents movement of the link 19, so that as a result the lever 15 will at this time necessarily turn about the pivot 16 in a clockwise direction, as viewed in FIG. 1, and the link 18 will thus act through the pin 20 on the ring 21 to automatically set the aperture in accordance with the lighting conditions as determined by the engagement of the scanning edge of the scanning means 5 with the element 3. At this time the coupling pin 35 will be located in the slot 39 to the left of the projection 43, as viewed in FIG. 1, so that the slot 39 will in no way influence the coupling pin 35, and in addition the length of the slot 39 is made sufficiently large to guarantee the full range of movement of both of the setting means under all conditions. The same is true of the length of the slot 40.

After the exposure is made the parts will return to their rest positions in a manner described above, and of course if the ring 33 remains in the position providing the selected exposure time, the ring 23 will also remain in its manually determined position while the rod 12 returns to its starting position and returns the scanning means 5 to its rest position, and of course under these conditions the ring 21 will be returned to its starting position where the pin 20 engages the end 26a of the slot 26. If the operator returns the ring 33 to its automatic position then the coupling pin 35 will return the ring 23 to its starting position, and in this position the pin 22 engages the left end of the slot 27, as viewed in FIG. 1, so that just before the ring 33 reaches its automatic position the coupling pin 35 will ride out of the notch 42 and onto the aligned projections 43, 30 and 44.

Assuming that the operator wishes to make an exposure with a preselection of a given aperture, then the operator will simply turn the ring 33 in a direction opposite to that indicated by the arrow c in FIG. 1, and thus the pin 35 will enter into the notch 41 and will displace the ring 21 in a clockwise direction providing manual setting of the exposure aperture. Of course, during this manual setting of the diaphragm the pin 20 will act on the link 18 to turn the lever 15 in a clockwise direction, as viewed in FIG. 1, about the pin 16, the pin 22 engaging the left end of the slot 27, as viewed in FIG. 1, at this time so that the link 19 cannot move, and the operator will position the ring 33 at the angular location which aligns a selected graduation of the scale 32 indicating the selected aperture with the index 31. The slot 50 of the control disc 49 will of course now be displaced to the other side of the pin 51, so that when the operator subsequently depresses the rod 12 to make the exposure the pin 51 will again engage the periphery 49a of the control disc 49 to prevent movement of the positioning means 53 with the elongated portion 6 of the scanning means 5, so that the positioning means does not maintain the lever 15 in its neutral position at this time, and during the downward movement of the scanning means, the differential means will automatically set the exposure time, the lever 15 at this time turning about the pivot 17 since the link 18 is prevented from moving by the releasable detent means 37, 38 and thus through the link 19 the differential means will act on the exposure time setting ring 23 for setting the exposure time according to the lighting conditions.

After the exposure is made the operator will again release the rod 12 and the parts will return to their positions which they had before the rod 12 was depressed, and in this particular example the ring 23 will of course be returned to its starting position while the ring 21 will remain in the position to which it it has been angularly turned by the operator, and although the pin 35 extends at this time through the portion of the slot 40 to the right of the projection 44, as viewed in FIG. 1, this slot 40 is made sufficiently long so that there will be no interference between the ring 23 and the pin 35.

The embodiment of FIG. 2 differs from that of FIG. 1 only in that the control disc 49 is omitted and instead the positioning means 53 is provided with an elongated sleeve or tubular portion 59 through which the elongated portion 6 of the scanning means 5 slidably extends so that in this way it is not possible for the positioning means 53 to tilt with respect to the elongated portion 6 of the scanning means 5. Thus, with this construction when the ring 33 is placed by the operator in the automatic position the cooperation of the tubular portion 59 with the elongated portion 6 will guarantee that the lever 15 does not turn from its neutral position so that the links 18 and 19 will move uniformly and equally in a downward direction to provide automatic and simultaneous setting of the exposure time and aperture, as described above, the spring 57 maintaining the ends 55 and 56 of the member 53 in engagement with the lever 15 at this time, as indicated in FIG. 2. If, for example, the operator makes a preselection of a given exposure time, then the link 19 will be moved in the direction of the arrow *d* shown in FIG. 2, so that the lever 15 will turn about its pivotal connection with the link 18, and the arm 15*b* of the lever 15 will move downwardly away from the end 56 of the positioning member 53 while the arm 15*a* remains in engagement with the end 55 of the member 53. Then, during the subsequent actuation of the rod 12 the lever 15 will turn as described above about its pivotal connection to the link 19 while the motion of the scanning means is transmitted through the link 18 to the aperture setting means for automatically setting the aperture in accordance with the lighting conditions. In the same way, when the operator makes a preselection of a given aperture the arm 15*a* will move away from the end 55 of the positioning member 53 while the arm 15*b* remains in engagement with the end 56 thereof, and of course during subsequent actuation of the rod 12 the lever 15 will turn about its pivotal connection to the link 18 while the exposure time is set through the link 19. Thus, with the embodiment of FIG. 2 the positioning member 53 will be incapable of tilting with respect to the elongated portion 6 of the scanning means 5 while at the same time preventing turning of the lever 15 in the automatic position of the selecting means 33 and also permitting manual preselection of either the exposure time or the aperture.

While it is possible to provide different structures for coupling the ring 33 to the rings 21 and 23 and a different construction for the positioning means 53, the above-described structures shown in the drawings are preferred because of their simplicity and reliability in operation.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, exposure time setting means; aperture setting means; light-responsive means having an element whose position is determined by the lighting conditions; scanning means for scanning the position of said element of said light-responsive means; differential means driven by said scanning means and operatively connected to both of said setting means for transmitting the movement of said scanning means in a predetermined ratio to both of said setting means for automatically actuating the latter to set the exposure time and aperture of the camera, said differential means distributing the drive of said scanning means to both of said setting means in said predetermined ratio when said differential means is in a predetermined neutral position; manually operable selecting means having an automatic position in which both of said setting means are to be set automatically and being selectively movable from said automatic position for selectively actuating a selected one of said setting means for manually setting the selected setting means, said differential means operating automatically when said manually operable selecting means is displaced from said automatic position thereof for automatically setting that one of said setting means which is not manually set; and positioning means operatively engaging said differential means and automatically maintaining the latter in said neutral position thereof when said manually operable selecting means is in said automatic position thereof at least until that one of said setting means which has the shorter range of movement has been moved through its entire range.

2. In a camera as recited in claim 1, releasable detent means operatively connected to said manually operable selecting means for releasably maintaining the latter in the position in which it is placed by the operator.

3. In a camera, in combination, exposure time setting means; aperture setting means; light-responsive means having an element whose position is determined by the lighting conditions; scanning means for scanning the position of said element of said light-responsive means; differential means driven by said scanning means and operatively connected to both of said setting means for transmitting the movement of said scanning means in a predetermined ratio to both of said setting means for automatically actuating the latter to set the exposure time and aperture of the camera, said differential means distributing the drive of said scanning means to both of said setting means in said predetermined ratio when said differential means is in a predetermined neutral position; manually operable selecting means having an automatic position in which both of said setting means are to be set automatically and being selectively movable from said automatic position for selectively actuating a selected one of said setting means for manually setting the selected setting means, said differential means operating automatically when said manually operable selecting means is displaced from said automatic position thereof for automatically setting that one of said setting means which is not manually set, said manually operable selecting means being movable in one direction from said automatic position thereof for setting the exposure time and in an opposite direction from said automatic position thereof for setting the aperture; and positioning means operatively engaging said differential means and automatically maintaining the latter in said neutral position thereof when said manually operable selecting means is in said automatic position thereof at least until that one of said setting means which has the shorter range of movement has been moved through its entire range.

4. In a camera, in combination, exposure time setting means; aperture setting means; light-responsive means responding to the lighting conditions and having a movable element whose position is determined by the lighting conditions; scanning means for scanning the position of said movable element of said light-responsive means; differential lever means operatively connected to said scanning means to be driven thereby and operatively connected to both of said setting means for transmitting the drive of said scanning means in a predetermined ratio to both of said setting means when said differential lever means is in a predetermined neutral position, for automatically setting both of said setting means according to the lighting conditions; manually operable selecting means having an automatic position in which both of the setting means are to be set automatically and being selectively movable by the operator from said automatic position for selectively manually setting one of said setting means, said differential lever means automatically setting that one of said setting means which is not manually set by the operator when said manually operable selecting means is displaced from said automatic position thereof; and positioning means operatively engaging said differential lever means for maintaining the latter in said neutral position thereof when said manually operable selecting means is in said automatic position at least until that one of said setting means which has the shorter range of movement moves through its entire range.

5. In a camera as recited in claim 4, said differential lever means including an elongated lever turnably connected intermediate its ends to said scanning means for movement therewith as well as for turning movement relative thereto, and a pair of links respectively pivotally connected to said lever on opposite sides of the pivotal connection thereof to said scanning means at predetermined distances from said pivotal connection to provide said predetermined ratio of distribution of the drive from said scanning means to said pair of setting means, said links respectively having portions distant from said lever operatively connected respectively to said pair of setting means for actuating the latter during movement of said lever with said scanning means, said lever having a given angular position when said differential lever means is in said neutral position thereof and said positioning means preventing turning of said lever from said given angular position thereof when said manually operable selecting means is in said automatic position thereof until the setting means having the shorter range of movement has been moved through its entire range.

6. In a camera as recited in claim 5, said links being located equidistantly from said pivotal connection of said lever to said scanning means for distributing the drive equally to said pair of setting means.

7. In a camera, in combination, a rotary exposure-time setting ring formed with an arcuate slot extending along a circle whose center is in the turning axis of said ring and said ring having a projection located in said slot adjacent one end thereof and defining a notch with said one end of said slot; a rotary aperture setting ring coaxial with said rotary exposure-time setting ring and also formed with an arcuate slot extending along a circle of the same diameter as that along which said slot of said exposure-time setting ring extends, said aperture setting ring also having a projection located in said slot thereof adjacent an end of said slot thereof and defining with the latter end of said slot a notch located between said projection and end of said slot of said aperture setting ring, both of said rings respectively having predetermined starting positions where said projections are aligned and said slots respectively extending in opposite directions from said projections in said starting positions of said rings with one of the notches located on one side of said aligned projections and with the other of said notches located on the other side of said aligned projections; a rotary, manually operable selecting ring coaxial with said exposure-time setting ring and said aperture setting ring, said selecting ring having an automatic position in which the other two rings are to be automatically turned and said selecting ring being manually turnable from said automatic position thereof in one direction for manually setting the exposure time and in an opposite direction for manually setting the aperture; a coupling pin operatively connected to said selecting ring and extending parallel to the common axis of all of said rings, said coupling pin being carried by said selecting ring for movement toward and away from the turning axis thereof and said coupling pin engaging both of said projections when said selecting ring is in said automatic position thereof and both of said setting rings are in their starting positions; spring means operatively connected to said pin for urging the latter toward said common axis of said rings so that when said selecting ring is turned in one direction from said automatic position said coupling pin will be moved by said spring means into one of said notches for turning the setting ring which has said one notch while when said selecting ring is turned in the other direction of said automatic position thereof said pin will be moved by said spring means into the other of said notches for turning the ring provided with said other notch; a stationary projection engaging said pin when said selecting ring is in said automatic position thereof and preventing movement of said pin by said spring means even when said setting rings move away from said starting positions thereof while said selecting ring remains in said automatic position thereof; and means operatively connected to both of said setting rings for automatically turning both of said setting rings to automatically set the exposure time and aperture in accordance with the lighting conditions when said selecting ring is in said automatic position thereof and to automatically turn that one of said setting rings which is not displaced by said selecting ring when the latter is displaced from said automatic position thereof for automatically turning the non-selected ring in accordance with the lighting conditions.

8. In a camera as recited in claim 7, said selecting ring carrying a lever which is turnably connected to said selecting ring and said coupling pin being carried by said lever for turning movement therewith, said spring means urging said lever to turn in a direction in which said coupling pin approaches the common axis of all of said rings.

9. In a camera as recited in claim 7, releasable detent means cooperating with said selecting ring for releasably maintaining the latter in the angular position in which it is placed by the operator.

10. In a camera, in combination, light-responsive means having a movable element whose position is determined by the lighting conditions; scanning means for scanning the position of said element of said light-responsive means, said scanning means having an elongated portion; an elongated lever pivotally connected intermediate its ends to said elongated portion of said scanning means; an elongated positioning member formed with an opening through which said elongated portion of said scanning means freely extends and said positioning member having on opposite sides of said elongated portion of said scanning means a pair of end portions engaging said lever on opposite sides of the pivotal connection thereof to said elongated portion of said scanning means; spring means urging said positioning member toward said lever for resiliently urging said ends of said positioning member into engagement with said lever for positioning the latter in a given angular position with respect to said elongated portion of said scanning means when both of said ends of said positioning member engage said lever; a pair of links pivotally connected to said lever on opposite sides of the pivotal connection thereof to said elongated portion of said scanning means; exposure-time setting means operatively connected to one of said links; aperture setting means operatively connected to the other of said links; and manually operable selecting means having an automatic position when both of said setting means are to be automatically set and being movable by the operator from said automatic position for selectively positioning one of said setting means, said lever and links forming a differential means which transmits movement of said scanning means to both of said setting means when said selecting means is in said automatic position thereof and which moves that one of said setting means which is not manually positioned by said selecting means when the latter is displaced by the operator from said automatic position thereof, said positioning member and spring means acting on said lever to maintain the latter in said predetermined position when said selecting means is in said automatic position thereof so as to prevent turning of said lever during transmission of the movement of said scanning means to both of said setting means simultaneously.

11. In a camera as recited in claim 10, said lever being pivotally connected intermediate its ends to said elongated portion of said scanning means and said positioning member having at its opposite ends a pair of projections extending toward and engaging said lever on opposite sides of said pivotal connection thereof to said elongated portion of said scanning means.

12. In a camera as recited in claim 10, a rotary control ring operatively connected to said selecting means to be turned thereby and having a predetermined angular position when said selecting means is in said automatic position thereof, said control ring being formed with a radial slot extending to the outer periphery thereof and said positioning member carrying a pin which is received in said slot when said selecting means is in said automatic position thereof and when said scanning means moves during scanning of said position of said element of said light-responsive means, so that when said selecting means is in said automatic position said positioning member will move with said lever to maintain the latter in said predetermined position thereof, said slot of said control ring being displaced from said pin when said selecting means is displaced from said automatic position thereof so that when said scanning means moves said pin will then engage the periphery of said control ring to prevent movement of said positioning member with said lever so that the latter is free to turn with respect to said elongated portion of said scanning means in order to transmit movement to that one of said setting means which has not been manually set.

13. In a camera as recited in claim 10, said positioning member having an elongated tubular portion through which said elongated portion of said scanning means slidably extends so as to prevent tilting of said positioning member with respect to said elongated portion of said scanning means.

References Cited by the Examiner
UNITED STATES PATENTS

| | | | |
|---|---|---|---|
| 3,044,376 | 7/62 | Gebele | 95—10 |
| 3,065,683 | 11/62 | Gebele et al. | 95—10 |
| 3,067,665 | 12/62 | Gebele | 95—10 X |
| 3,071,054 | 1/63 | Singer | 95—10 |
| 3,087,396 | 4/63 | Winkler | 95—10 |

NORTON ANSHER, *Primary Examiner.*
EMIL G. ANDERSON, *Examiner.*